United States Patent [19]

Ishikawa et al.

[11] Patent Number: 5,745,216
[45] Date of Patent: Apr. 28, 1998

[54] EXPOSURE APPARATUS CAPABLE OF SHIFTING AND REMOVING A PLURALITY OF FILTERS FROM A LIGHT PATH

[75] Inventors: Masazumi Ishikawa; Tohru Tanibata, both of Wakayama-ken, Japan

[73] Assignee: Noritsu Koki Co., Ltd., Wakayama-ken, Japan

[21] Appl. No.: 557,500

[22] Filed: Nov. 14, 1995

[30] Foreign Application Priority Data

Nov. 14, 1994 [JP] Japan .................... 6-279194

[51] Int. Cl.$^6$ .................... G03B 27/72; G03B 27/32; G03B 27/54
[52] U.S. Cl. .................... 355/71; 355/32; 355/35; 355/67
[58] Field of Search .................... 355/69–71, 67, 355/32, 35, 37

[56] References Cited

U.S. PATENT DOCUMENTS

| | | | |
|---|---|---|---|
| 3,801,198 | 4/1974 | David | 355/32 |
| 3,982,825 | 9/1976 | Mitchell | 350/313 |
| 4,143,966 | 3/1979 | Gandini | 355/35 |
| 4,249,807 | 2/1981 | Webster et al. | 354/4 |
| 4,827,434 | 5/1989 | Hannau et al. | 354/526 |
| 4,831,436 | 5/1989 | Birgmeir et al. | 358/75 |
| 5,231,537 | 7/1993 | Hama | 359/889 |
| 5,262,832 | 11/1993 | Takeda | 355/326 R |
| 5,488,450 | 1/1996 | Tanibata | 355/38 |

*Primary Examiner*—R. L. Moses
*Assistant Examiner*—Shival Virmani
*Attorney, Agent, or Firm*—Wenderoth, Lind & Ponack

[57] ABSTRACT

An exposure apparatus capable of color exposure operation and monochrome exposure operation. When a color exposure operation request is made, at least one of a red, blue, or green filter is positioned in a light path to produce exposure light having a predetermined wavelength. When a monochrome operation request is made, the color filters are retracted so as to allow white exposure light to pass.

4 Claims, 5 Drawing Sheets

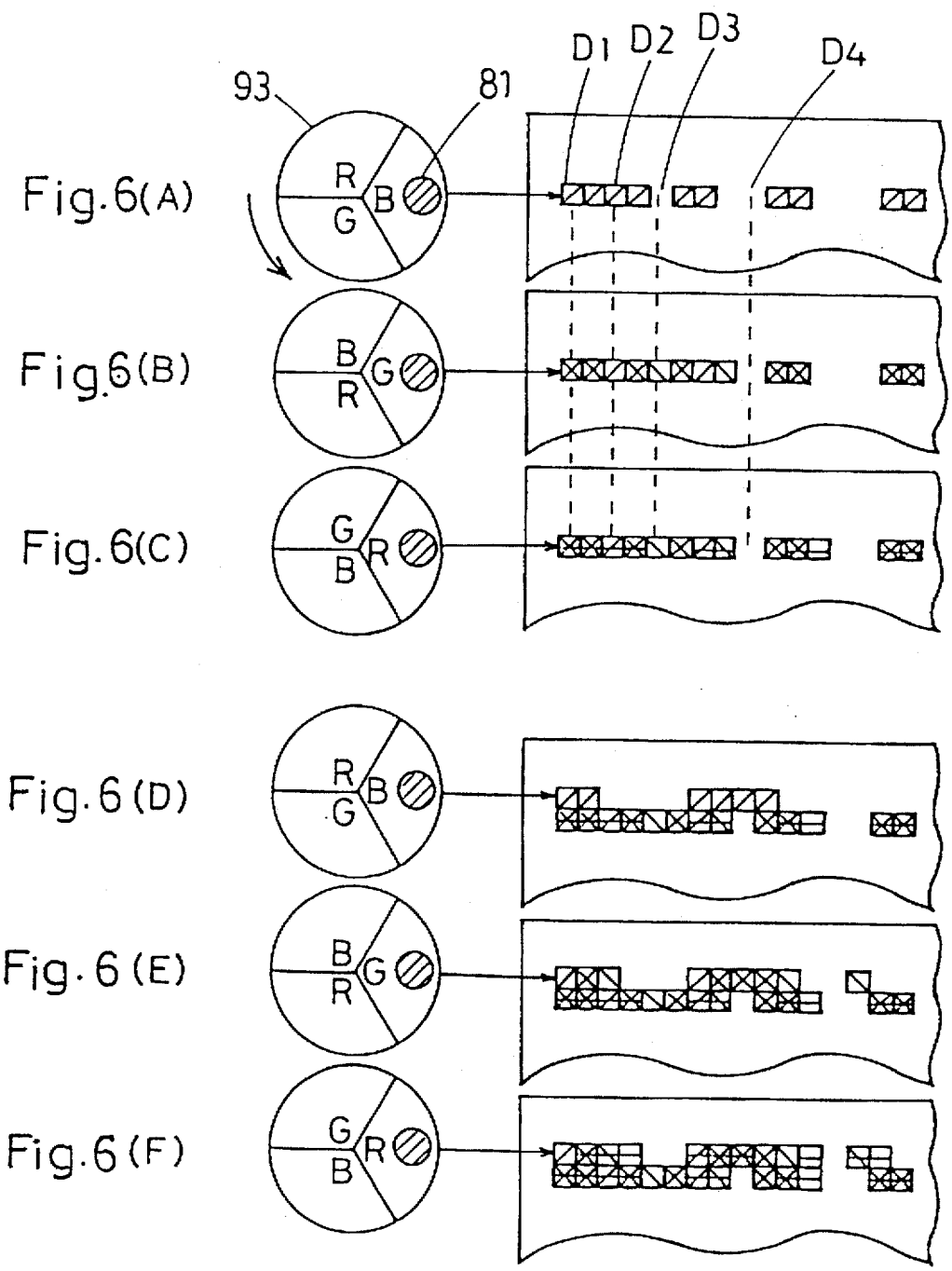

EXPOSURE APPARATUS CAPABLE OF SHIFTING AND REMOVING A PLURALITY OF FILTERS FROM A LIGHT PATH

BACKGROUND OF THE INVENTION

The present invention relates to an exposure apparatus for use in a photographic printer and more specifically, to a digital exposure apparatus provided with an exposure shutter made of PLZT, liquid crystal, or similar components.

The exposure apparatus of the present invention includes a color shifter disk which has three color filters (blue, green and red (referred to as B, G, and R hereinafter)) and is disposed across a light path between a light source and a PLZT shutter. During operation of the exposure apparatus, an intensity of light emitted in the form of a dot to expose a photosensitive material is shifted to one of B, G, and R wavelengths by the color shifter disk and a voltage is applied to a corresponding PLZT element of the PLZT shutter. The voltage applied to a particular PLZT element is controlled depending on the mode of light desired.

On the other hand, the color shifter of the conventional exposure apparatus is arranged such that at least one of its filters remains in the light path. If a monochrome exposure operation is requested, it can only be implemented by applying the B, G, and R wavelengths of light one over the other. This operation will take the same length of exposure operation time as of a full color exposure operation.

It is an object of the present invention, in view of the foregoing drawback, to provide an exposure apparatus capable of carrying out a monochrome exposure operation faster than a full color exposure operation.

SUMMARY OF THE INVENTION

An exposure apparatus according to the present invention has a light source for emitting light along a light path, an electrical exposure shutter, a color shifting disk disposed between said light source and said electrical exposure shutter, wherein said color shifting disk comprises a plurality of filters having different colors, a disk locating motor operable so as to position said color shifting disk in the light path upon a request for a color exposure operation, and for retracting said color shifting disk from the light path so as to allow the light transmitted from said light source to travel along the light path in a manner so as to be unaffected by said color shifting disk upon a request for a monochrome exposure operation.

In operation, the exposure apparatus of the present invention allows one of the color filters of the color shifter disk to be moved into the light path. More particularly, a predetermined wavelength of exposure light can be allowed to pass through the exposure shutter for the color exposure action by selectively shifting from one to another of the Blue, Green, or Red color filters.

In the case of a monochrome exposure operation, the color filters of the color shifting means are retracted and remain away from the light path thus allowing a white light only to pass.

BRIEF DESCRIPTION OF THE DRAWINGS

FIG. 6 is a diagram explaining a color exposure operation; and

DETAILED DESCRIPTION OF THE PREFERRED EMBODIMENT

Figure 1:
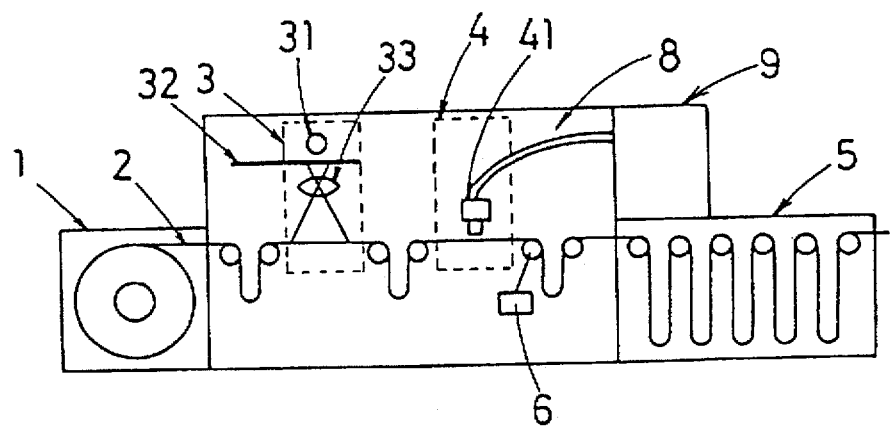
FIG. 1 is an overall schematic view of a photographic printer provided with an exposure apparatus of the present invention.
Figure 2:
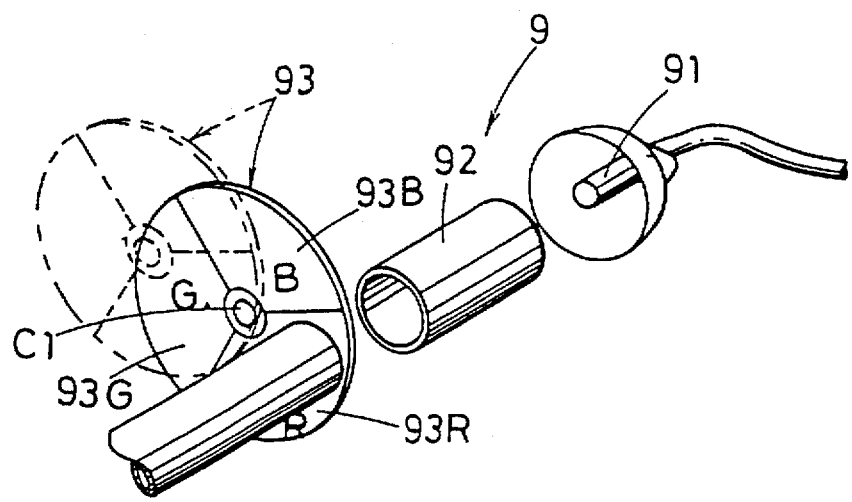
FIG. 2 is a perspective view of an embodiment of the exposure apparatus of the present invention.

FIG. 1 is an overall schematic view of a photographic printer provided with the exposure apparatus of the present invention.

As shown in FIG. 1, there are provided a magazine 1 for holding a supply of printing paper 2 of a photosensitive material, a negative exposure station 3 having a light source 31 and a lens 33 for projecting an image from a negative film 32 onto the printing paper 2, a line exposure station 4 for printing a digital image, a development processor 5 for developing the printing paper 2 that is exposed, and a conveying means or mechanism 6 for transferring the printing paper 2 lengthwise on a line-by-line and frame-by-frame basis.

The photographic printer also includes a line exposure controller (not shown) which acts as a voltage shifting means for controlling exposure timing in the line exposure station 4 and the transfer timing in the conveying mechanism 6.

The line exposure station 4 is provided for printing a digital image, read with a scanner or produced by an electronic processing device such as a computer, on the printing paper.

The line exposure station 4 is equipped with a PLZT shutter 41 comprising rows of PLZT elements (not shown) in which each row extends widthwise on the printing paper 2.

The PLZT shutter 41 is coupled to a bundle of optical fiber materials 8 for transmission of light from a light source.

More specifically, the optical fiber bundle 8 is connected at its proximal end (at the light input side) with a PLZT light source 9 (described later) which emits white light or light having a wavelength of B, G, and R light.

The PLZT elements are energized by their respective levels of voltage corresponding to the wavelengths of light determined by the timed rotating action of a color shifter disk 93 (a color shifting means) which will be described below in more detail. As the result, a given wavelength of light transmitted from the optical fiber bundle 8 can be passed selectively.

The PLZT light source 9 comprises a lamp 91, a mirror tunnel 92, and the color shifter disk 93 and is coupled to the proximal end of the optical fiber bundle 8.

The color shifter disk 93 has B, G, and R colored filters 93B, 93G, and 93R made by dividing a disk body into three equal segments. The filters 93B, 93G, and 93R are formed of a 120-degree fan shape about the center C1 of the color shifter disk 93.

Figure 3:
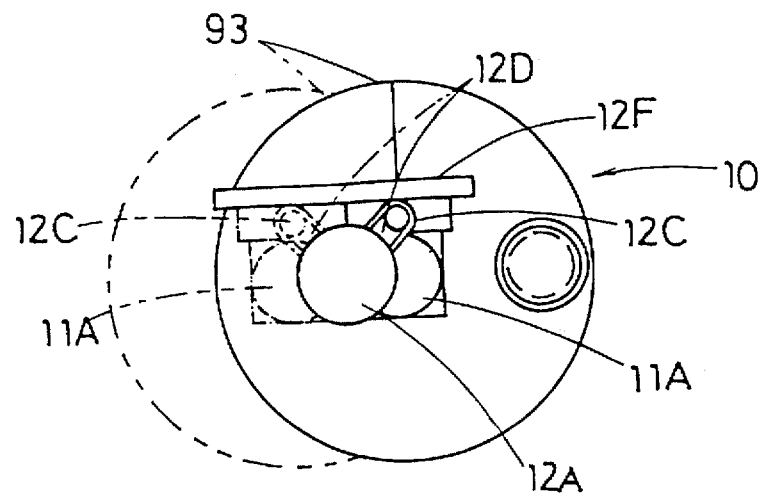
FIG. 3 and 4 are a plan and a side view of a shifting mechanism for a color shifter disk in the embodiment.
Figure 4:
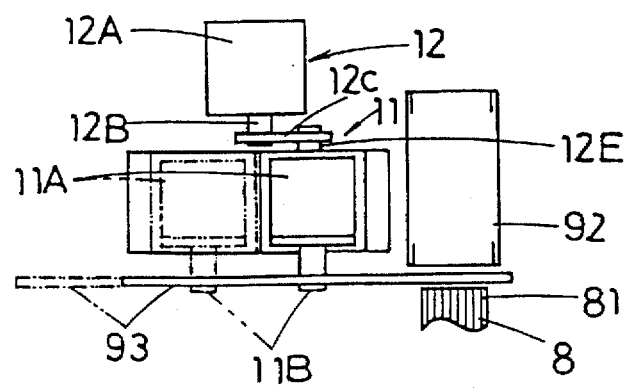
Figure 5:
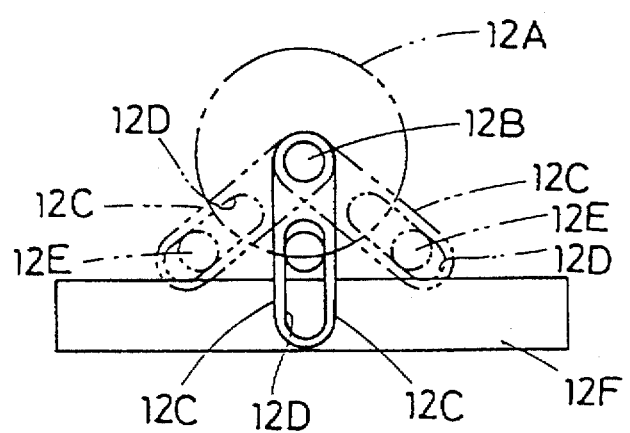
FIG. 5 is a view explaining the operation of the shifting mechanism for the color shifter disk in the embodiment.

FIGS. 3 to 5 illustrate a shifting mechanism 10 for the color shifter disk 93.

The shifting mechanism 10 comprises a disk rotating means 11 for rotating the color shifter disk 93, and a disk locating means 12 for moving the color shifter disk 93 forward and backward.

The disk rotating means 11 comprises a disk rotating motor 11A of which drive shaft 11B is coupled to the center C1 of the color shifter 93 as shown. As the color shifter disk 93 is rotated by the motor 11A, one of its color filters 93B, 93G, or 93R is selectively disposed in the light path. Accordingly, the B, G, and R wavelengths of light determined by their respective filters 93B, 93G, and 93R are transmitted through an input cross section 81 of the proximal end of the optical fiber bundle 8 to each of the PLZT elements of the PLZT shutter 41.

The disk locating means 12 comprises a slide arm 12C fixedly mounted to the drive shaft 12B of a disk locating motor 12A and has a long slot 12D therein and a slide pin 12E mounted to the disk rotating motor 11A. The slide pin 12E is arranged so that its distal end can move in and along the long slot 12D of the slide arm 12C. Accordingly, when the slide arm 12C is turned to the left and right by the operation of the drive shaft 12B of the disk locating motor 12A, the slide pin 12E travels leftward and rightward with the disk rotating motor 11A (FIG. 3). Also shown is a slide mount 12F.

The leftward and rightward traveling of the disk rotating motor 11A causes the color shifter disk 93 to move in its entirety into and out of the light path between the input cross section 81 of the optical fiber bundle 8 and the mirror tunnel 92 (FIG. 4).

As the color shifter disk 93 has been moved forward and disposed in the light path, it is rotated by the disk rotating means 11 to interrupt the light path with its color filters 93B, 93G, and 93R. The wavelengths of light determined by their respective filters 93B, 93G, and 93R fall on the input cross section 81 of the optical fiber bundle 8 and 4 and are directed to each of the PLZT elements of the PLZT shutter 41 for color exposure action.

When the color shifter disk 93 has been returned backward and retracted from the light path, the monochrome exposure action can be performed.

The disk locating means 12 may be modified in structural design, e.g. having a belt, cam, ballscrew, or rack-pinion mechanism.

The color exposure action for respective B, G, and R wavelengths of light will now be explained referring to FIG. 6.

When the B color filter is placed in the light path, the line exposure controller is actuated to shift the voltage of the PLZT element to 45 V. Accordingly, the printing paper 2 is exposed to the B wavelength of light producing a pattern of B color dots D1, D2, . . . , as shown in FIG. 6(A).

Then, when the G color filter is placed in the light path by a rotating action of the color shifter disk 93, the voltage of the PLZT element is shifted by the line exposure controller to 50 V. As the result, the printing paper 2 is exposed to the G wavelength of light producing a pattern of G color dots D1, D3, . . . , as shown in FIG. 6(B).

Also, when the R color filter is placed in the light path by a further rotating action of the color shifter disk 93, the voltage of the PLZT element is shifted by the line exposure controller to 55 V. Accordingly, the printing paper 2 is exposed to the R wavelength of light producing a pattern of R color dots starting from D1, as shown in FIG. 6(C).

Through a single sequence of the above three exposure operations, the dot D1 is exposed to all three, B, G, and R, colors, while the dot D2 being exposed to two, B and R, colors, the dot D3 to one, G, color, and the dot D4 not being exposed at all.

While the printing paper 2 is exposed to a series of the three, B, G, and R, different wavelengths of light, the paper remains the same location so as to print one row of dots extending widthwise on the printing paper 2. After the sequence of the three exposure actions is completed, the printing paper 2 is advanced by a distance of one dot size.

As the result, the exposure location on the printing paper 2 is moved to the second row of dots as shown in FIG. 6(D) to 6(F).

Similarly, another sequence of the three exposure actions to the B, G, and R, wavelengths of light is then performed in synchronization with the rotation of the color shifter disk 93, yielding the second row of color dots.

The printing paper 2 is further advanced by the distance of one dot size after printing of the second row of B, G, and R color dots.

As the sequence of the exposure operations is repeated, the printing paper 2 is printed on in a lengthwise direction.

Figure 7A:
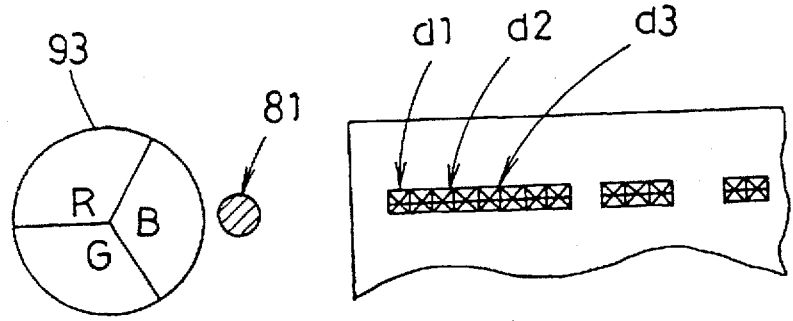
FIG. 7 is a diagram explaining a monochrome exposure operation.

The monochrome exposure operation with the color shifter disk 93 being retracted from the light path to allow a white light to run through the optical fiber bundle 8 will be explained next referring to FIG. 7.

The line exposure controller is at first actuated to shift the voltage of the PLZT element to 50 V. Accordingly, the printing paper 2 is exposed to the monochrome wavelength of light producing a pattern of black color dots d1, d2, d3, . . . (FIG. 7(A)). As the result, a row of monochrome dots are printed widthwise on the printing paper 2.

Figure 7B:
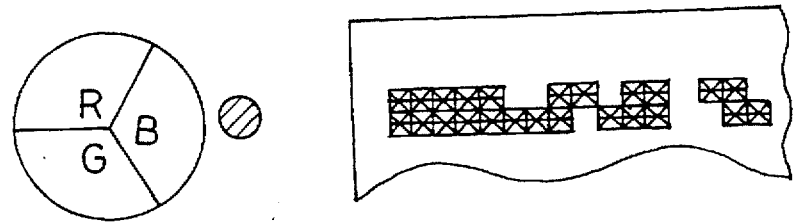

After the printing paper 2 is advanced by the distance of one dot size, the printing paper is exposed to another pattern of the monochrome wavelength light (FIG. 7(B)) so as to yield a second row of monochrome dots.

Figure 7C:
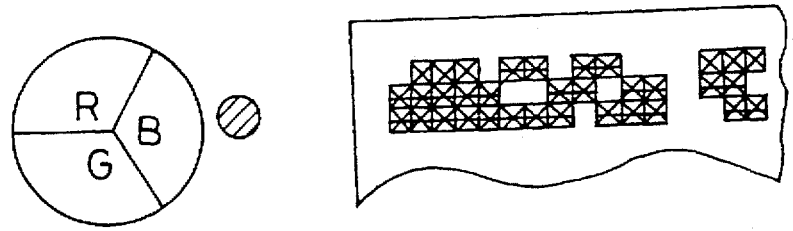

Then, the printing paper 2 is further advanced by the distance of one dot size and is exposed to a further pattern of the monochrome wavelength light (FIG. 7(C)) so as to yield a third row of monochrome dots.

By repeating the exposure operations row by row, a multiplicity of the monochrome dots are printed lengthwise on the printing paper 2.

Meanwhile, the printing paper 2 exposed at either, or both, of the negative exposure station 3 or the line exposure station 4 is developed and is cut into pieces of a frame size in the development processor 5 before being discharged.

It should be understood that the exposure apparatus of the present invention is not limited to the foregoing embodiment installed in the photographic printer but may be applied to other devices for exposing different types of photosensitive material to an irradiation of light rays.

We claim:

1. An exposure apparatus, comprising:
    a light source for emitting light along a light path;
    an electrical exposure shutter;
    a color shifting means for changing a wavelength of the light transmitted from said light source into light having predetermined wavelengths, wherein the changing of the wavelength of light occurs prior to the light being irradiated onto a photosensitive material in a pattern of dots;
    a locating means for positioning said color shifting means in the light path during a color exposure operation, and for retracting said color shifting means from the light path so as to allow the light transmitted from said light source to travel along the light path in a manner so as to be unaffected by said color shifting means during a monochrome exposure operation.

2. An exposure apparatus as recited in claim 1, wherein the predetermined wavelengths of light of said color shifting means corresponds to red light, green light, and blue light.

3. An exposure apparatus, comprising:

a light source for emitting light along a light path;

an electrical exposure shutter;

a color shifting disk disposed between said light source and said electrical exposure shutter, wherein said color shifting disk comprises a plurality of filters having different colors;

a disk locating motor operable so as to position said color shifting disk in the light path during a color exposure operation, and operable so as to retract said color shifting disk from the light path allowing the light transmitted from said light source to travel along the light path in a manner so as to be unaffected by said color shifting disk during monochrome exposure operation.

4. An exposure apparatus as recited in claim 3, wherein the plurality of filters of said color shifting disk comprises a red filter, a green filter, and a blue filter.

* * * * *